E. B. WINSLOW.
TRACE-GEARING.
No. 174,050.
Patented Feb. 22, 1876.
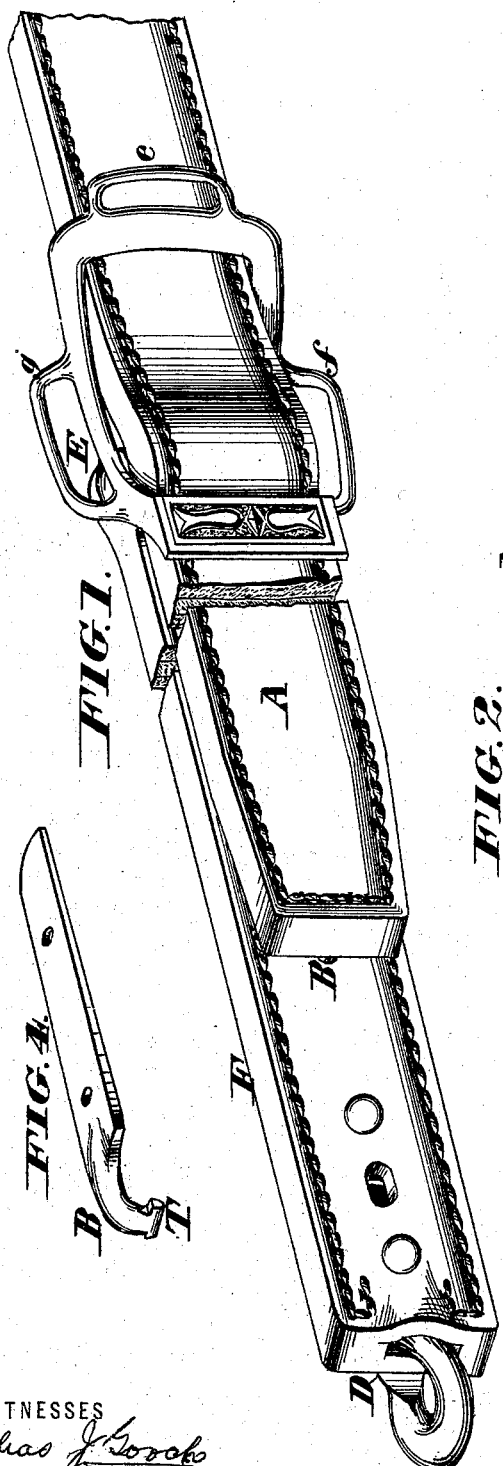
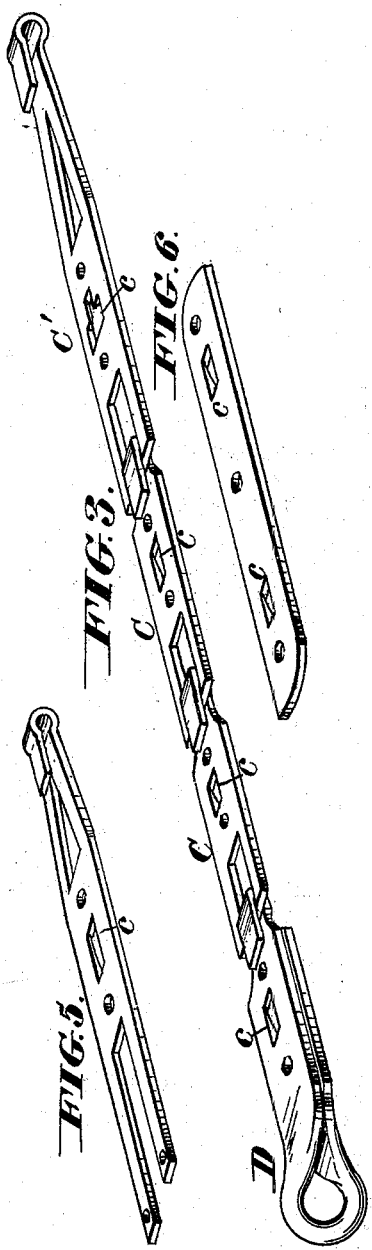
WITNESSES
Chas J. Gooch
Henry Tanner
INVENTOR
Edward B. Winslow.
By Knight Bros. Attorneys

UNITED STATES PATENT OFFICE.

EDWARD B. WINSLOW, OF GIRARD, ILLINOIS.

IMPROVEMENT IN TRACE-GEARINGS.

Specification forming part of Letters Patent No. 174,050, dated February 22, 1876; application filed January 22, 1875.

*To all whom it may concern:*

Be it known that I, EDWARD B. WINSLOW, of Girard, in the county of Macoupin and State of Illinois, have invented a new and Improved Trace-Gearing, of which the following is a specification:

My improvement relates to means for connecting the trace to the hame-tug in a manner which permits of its ready adjustment, and at the same time possesses all the strength of a rigid metallic connection. To this end I apply and secure within the tug one or more plates of either sheet or cast metal, each provided with one or more longitudinal slots for the reception of the trace-hook, hereinafter referred to, and permitting the adjustment in length of the trace. The series of plates extends from the hame-clip in front to a slide at the rear, through which the trace is passed. At the forward extremity of the trace is secured a hook with a transverse or T shaped head, which hook may be conveniently constructed from the half of a hame-clip of ordinary form. The socket-plates, with the exception of the rear one of the series, are each formed with one or more slots, longer longitudinally than transversely, so as to permit the insertion of the T-head when the hook is turned in transverse position, and securely hold it when the hook, with the trace attached, is turned into its longitudinal or working position. The rear plate, or that which is next the trace-slide, and so close thereto as to preclude or prevent the turning of the trace end into transverse position, is preferably constructed with a T-shaped slot or aperture, so that the hook may be inserted by a direct movement into the wider front end of the slot, and, being drawn back into the rear end, will be securely held. A plain slot or socket of sufficient width to admit the hook may, if preferred, be used, as its proximity to the trace-slide adapts the latter to serve as a keeper and prevent its escape.

In the accompanying drawings, Figure 1 is a perspective view of my device shortened, so as to admit of convenient representation. Fig. 2 is a longitudinal section of the same. Fig. 3 is a perspective view of the chain of plates with connected clip, detached from the hame-tug. Fig. 4 is a perspective view of the T-shaped trace-hook detached. Fig. 5 is a perspective view of the rear plate of the chain in modified form. Fig. 6 illustrates another modification of the slotted plates.

A represents a trace, the main portion of which may be of ordinary construction. Within its forward end is secured a hook, B, resembling in shape one-half of a customary hame-clip, and formed with a T-shaped extremity, T. *b* represents the flattened shank by which the hook is secured within the leather after the manner of a hame-clip. C C′ represent slotted plates, which may be connected together after the manner of a chain, as illustrated in Fig. 3, providing a direct metallic connection from the hame-clip D to the slide E, through which the trace A is passed. The plates C are provided each with one or more slots, *c*, which slots, with the exception of the rearmost one, *c′*, which is next to the slide, are formed longitudinally, so that they will admit the T-head of the hook B only when the latter is turned into transverse position, and will securely hold it when restored to its normal or working position. The leather of the tug is suitably perforated over the slots or sockets in the plates to admit the hook. A concavity is formed around the margin of each slot on the inner side of the plate, to accommodate the hook head T without causing any protuberance on the face of the tug next to the horse.

The plates may be hooked or hinged together or riveted permanently, or may be separate, and may be either simply inclosed in the leather of the tug, or riveted or stitched thereto either on the inside or outside.

In Fig. 3 I have shown these plates connected in the form of a chain, with one end of each turned through an eye in the end of the next plate and riveted on itself, so as to form a link-connection. The hook by which the rear plate C′ is attached is, preferably, left open to admit of applying additional plates or detaching the rear plate entirely, if necessary, to extend the length to suit the tug.

In Fig. 5 the plate is shown (as a modification) with provisions for riveting it directly to the adjacent plate. This mode may be adopted when the link-connection of the plates illustrated in Fig. 3 is worn by use.

In Fig. 6 is shown the plate with two of the slots c, said plate being adapted to be riveted to the adjacent plates or directly to the leather of the hame-tug F. It is preferred to use as many as five of the plates C in order to afford the necessary adjustment; but one, or any preferred number, may be used with one or more socket-slots in each, attached or not to hame-clip.

The hame-clip D is made somewhat heavier than usual, and has two or more of the socket-slots c formed within its flat shank, so as to serve the purpose of one of the plates C.

The slide E is constructed with a lip, e, for the reception of the breeching-strap, and loops f g, for the reception, respectively, of the belly-band and the suspension-strap, which is attached to the back-pad in customary manner.

My invention possesses great advantages in neatness and simplicity, and in the security with which the trace is held, and the facility afforded for adjusting or regulating its length, even after it may have become dry and hard from age or exposure; also, in leaving the trace entirely solid, no part of it having to be cut away for the admission of buckle-tongues; also, in affording a complete connection of metallic links or plates from the hame to the slide, thus adding great strength to the tug; also, in presenting a smooth and even surface on the side next the horse, so that it is not liable to chafe. It is also economical in construction both in labor and material. It also affords efficient means of keeping the end of the trace in place.

The invention is found to work well on hip-straps of harness, the open hook at the extremity being adapted to hook into a ring on the hip-strap, and serves as a gearing for the back-strap. It also constitutes one of the best trace-carriers. It is also useful as a coupling for pad-gearing, hip-strap, back-strap, crupper, and trace-gearing. It is also applicable to halters, crowns, and other parts of harness.

My trace-hook B may be used separately, in connection with or without the slide or the hame-clip D, but with the slotted plates C C, with two or more slots to the plate in any part of the harness, where they may be used practically for connecting all parts of the harness, as herein described.

The following is claimed as new:

A hame-tug having one or more longitudinally-slotted metallic socket-plates fastened within the leather of the tug, in combination with a trace-hook constructed with a T-head, substantially as and for the purposes set forth.

EDWARD B. WINSLOW.

Witnesses:
THOMAS DUNCAN,
HENRY C. HAMILTON.